(12) United States Patent
Meng et al.

(10) Patent No.: US 10,921,633 B2
(45) Date of Patent: Feb. 16, 2021

(54) DISPLAY PANEL AND DISPLAY DEVICE

(71) Applicant: BOE Technology Group Co., Ltd., Beijing (CN)

(72) Inventors: Xiandong Meng, Beijing (CN); Jifeng Tan, Beijing (CN); Xiaochuan Chen, Beijing (CN); Wei Wang, Beijing (CN); Xianqin Meng, Beijing (CN)

(73) Assignee: BOE TECHNOLOGY GROUP CO., LTD., Beijing (CN)

( * ) Notice: Subject to any disclaimer, the term of this patent is extended or adjusted under 35 U.S.C. 154(b) by 0 days.

(21) Appl. No.: 16/619,126

(22) PCT Filed: Jun. 14, 2019

(86) PCT No.: PCT/CN2019/091301
§ 371 (c)(1),
(2) Date: Dec. 4, 2019

(87) PCT Pub. No.: WO2020/007181
PCT Pub. Date: Jan. 9, 2020

(65) Prior Publication Data
US 2020/0371279 A1 Nov. 26, 2020

(30) Foreign Application Priority Data
Jul. 2, 2018 (CN) .......................... 201810708736.2

(51) Int. Cl.
*G02F 1/1335* (2006.01)
*F21V 8/00* (2006.01)
*G02F 1/1343* (2006.01)

(52) U.S. Cl.
CPC ..... *G02F 1/133512* (2013.01); *G02B 6/0038* (2013.01); *G02B 6/0061* (2013.01); *G02F 1/13439* (2013.01)

(58) Field of Classification Search
CPC ......... G02F 1/133524; G02F 1/133512; G02F 1/13439; G02B 6/0028; G02B 6/0038; G02B 6/0061
See application file for complete search history.

(56) References Cited

U.S. PATENT DOCUMENTS

| 4,924,079 A | 5/1990 | Opheij et al. |
| 5,959,704 A | 9/1999 | Suzuki et al. |

(Continued)

FOREIGN PATENT DOCUMENTS

| CN | 1043217 A | 6/1990 |
| CN | 103133941 A | 6/2013 |

(Continued)

OTHER PUBLICATIONS

Chinese Office Action dated Aug. 5, 2019 issued in corresponding Chinese Application No. 201810708736.2.

*Primary Examiner* — Dung T Nguyen
(74) *Attorney, Agent, or Firm* — Arent Fox LLP; Michael Fainberg

(57) ABSTRACT

A display panel and a display device. The display panel includes a light guide plate including a light incident surface and a light emergent surface; the light incident surface is one end surface of the light guide plate; an opposite substrate opposite to the light guide plate; a liquid crystal layer between light guide plate and opposite substrate; a light source located on the light incident surface of light guide plate; a light shielding layer at the side, facing liquid crystal layer, of the opposite substrate; the light shielding layer including light shielding regions, light transmitting regions; light converging elements located on light emergent surface of light guide plate, the light converging elements corresponding to one light shielding region; a transparent conductive structure between light guide plate and opposite (Continued)

substrate and configured to make liquid crystal layer be equivalent to a diffraction grating structure under control of electric signals.

19 Claims, 10 Drawing Sheets

(56) References Cited

U.S. PATENT DOCUMENTS

| | | | |
|---|---|---|---|
| 6,122,465 | A | 9/2000 | Hiyama et al. |
| 8,854,732 | B2 * | 10/2014 | Suganuma .......... G02B 6/0016 359/572 |
| 10,613,375 | B2 | 4/2020 | Ni et al. |
| 10,620,475 | B2 | 4/2020 | Tan |
| 2008/0158486 | A1 | 7/2008 | Kim et al. |
| 2011/0141395 | A1 | 6/2011 | Yashiro |
| 2015/0036068 | A1 * | 2/2015 | Fattal .................. G02B 6/0038 349/15 |
| 2018/0024289 | A1 | 1/2018 | Fattal |
| 2019/0094447 | A1 * | 3/2019 | Tan .................. G02F 1/133611 |
| 2020/0326584 | A1 * | 10/2020 | Tan .................. G02F 1/133514 |

FOREIGN PATENT DOCUMENTS

| | | |
|---|---|---|
| CN | 104914614 A | 9/2015 |
| CN | 106908993 A | 6/2017 |
| CN | 107238974 A | 10/2017 |
| CN | 107490901 A | 12/2017 |
| CN | 107533255 A | 1/2018 |
| CN | 107621729 A | 1/2018 |
| CN | 108646338 A | 10/2018 |
| EP | 1939672 A1 | 7/2008 |
| JP | H07253575 A | 10/1995 |
| KR | 100781383 B1 | 11/2007 |
| KR | 20080062766 A | 7/2008 |

* cited by examiner

DISPLAY PANEL AND DISPLAY DEVICE

This application is a National Stage of International Application No. PCT/CN2019/091301, filed on Jun. 14, 2019, which claims priority of the Chinese Patent Application No. 201810708736.2, filed to the Patent Office of the People's Republic of China on Jul. 2, 2018, and entitled "BACKLIGHT MODULE AND DISPLAY DEVICE", both of which are incorporated in this application by reference in their entireties.

FIELD

The disclosure relates to the technical field of display and in particular relates to a display panel and a display device.

BACKGROUND

There is a gray scale display technology in novel liquid crystal display (short for LCD) technologies, in a novel LCD device, a light emergent surface of a light guide plate is provided with a plurality of light extraction openings, moreover, light shielding regions are arranged on positions corresponding to all the light extraction openings, and due to the application of different electric signals to the liquid crystal layer, multi-gray-scale display is realized.

However, in the novel LCD device, the sizes of the light extraction openings in the light guide plate are limited by the sizes of the light shielding regions corresponding to the light extraction openings, the aperture rates of the display device may be affected by overlarge arrangement sizes of the light shielding regions, and therefore, the lighting effect of the display device is limited by the sizes of the light shielding regions, and the utilization rate of light energy of the display device needs to be increased.

SUMMARY

A display panel provided by some embodiments of the disclosure includes:

a light guide plate, the light guide plate including a light incident surface and a light emergent surface; the light incident surface being one end surface of the light guide plate;

an opposite substrate, arranged opposite to the light guide plate;

a liquid crystal layer, located between the light guide plate and the opposite substrate;

a light source, located on the light incident surface of the light guide plate;

a light shielding layer, located at the side, facing the liquid crystal layer, of the opposite substrate; the light shielding layer including a plurality of light shielding regions and light transmitting regions;

a plurality of grating light extraction openings, the grating light extraction openings being located on the light emergent surface of the light guide plate, and each of the grating light extraction openings corresponding to one of the light shielding regions, and the grating light extraction openings being internally provided with light converging elements, and the light converging elements being configured to converge light emitted from the light guide plate, and to make the light emitted from the light guide plate be emitted towards the corresponding light shielding regions when electric signals are not applied to the liquid crystal layer.

Alternatively, in some embodiments of the disclosure, the areas of orthographic projections of the light shielding regions on the light guide plate are smaller than the areas of the corresponding grating light extraction openings.

Alternatively, in some embodiments of the disclosure, the geometrical centers of the orthographic projections of the light shielding regions on the light guide plate are superposed with the geometrical centers of the corresponding light converging elements.

Alternatively, in some embodiments of the disclosure, the light source is located on one end surface of the light guide plate; the light converging elements include first gratings; and the grating periods of the first gratings are decreased with the increase of distances from the first gratings to the light source.

Alternatively, in some embodiments of the disclosure, the light source is located on one end surface of the light guide plate; the light converging elements include at least two second gratings;

each of grating periods of the at least two second gratings is fixed, and the grating periods of any two of the at least two second gratings are different;

and a grating period of one second grating is shorter than a grating period of another second grating, and a distance from the one second grating to the light source is longer than a distance from the another second grating to the light source.

Alternatively, in some embodiments of the disclosure, the light converging elements include a plurality of second gratings, the plurality of second gratings are arranged along the same straight line, and the extension directions of slits of all the second gratings are consistent.

Alternatively, in some embodiments of the disclosure, the display panel includes a plurality of sub-pixel units;

the sub-pixel units include the light shielding regions and the light transmitting regions located at two sides of the light shielding regions; and the arrangement directions of the light shielding regions and the light transmitting regions in the sub-pixel units are consistent to a direction from the light source to sub-pixels.

Alternatively, in some embodiments of the disclosure, in the light converging elements, one of the second gratings is used as the center, and other second gratings are uniformly arranged around the second grating located in the center.

Alternatively, in some embodiments of the disclosure, the light converging elements include nine second gratings, the nine second gratings are arranged in three rows and three columns; and the extension directions of slits of every two second gratings symmetric relative to the second grating located in the center are consistent.

Alternatively, in some embodiments of the disclosure, the light converging elements include Fresnel lenses.

Alternatively, in some embodiments of the disclosure, the display panel includes a plurality of sub-pixel units;

and the sub-pixel units include the light shielding regions and the light transmitting regions around the light shielding regions.

Alternatively, in some embodiments of the disclosure, the light shielding layer includes color filter films located in the light transmitting regions.

Alternatively, in some embodiments of the disclosure, the display panel is divided into a plurality of display units; the display units include at least one sub-pixel unit and transmission regions;

the sub-pixel units include the light shielding regions and the light transmitting regions;

and the transmission regions are the light transmitting regions except the light transmitting regions in all the sub-pixel units in the display units.

Alternatively, in some embodiments of the disclosure, the display panel further includes a coupling element located between a light emergent side of the light source and the light incident surface of the light guide plate;

and the coupling element is configured to couple the emergent light of the light source into the light guide plate at an incident angle meeting a total reflection condition of the light guide plate.

Alternatively, in some embodiments of the disclosure, the coupling element is a reflection grating or a freeform reflecting mirror.

Alternatively, in some embodiments of the disclosure, the display panel further includes a transparent conductive structure;

and the transparent conductive structure is configured to make the liquid crystal layer be equivalent to a diffraction grating structure under the control of the electric signals so that the light emitted from the light converging elements are emitted towards the corresponding light transmitting regions through the diffraction grating structure.

Alternatively, in some embodiments of the disclosure, the transparent conductive structure includes a first transparent electrode and a second transparent electrode;

and the first transparent electrode and the second transparent electrode are located between the opposite substrate and the liquid crystal layer.

Alternatively, in some embodiments of the disclosure, the transparent conductive structure includes a first transparent electrode and a second transparent electrode;

and the first transparent electrode and the second transparent electrode are located between the liquid crystal layer and the light guide plate.

Alternatively, in some embodiments of the disclosure, the transparent conductive structure includes a first transparent electrode and a second transparent electrode;

and the first transparent electrode and the second transparent electrode are respectively located at two sides of the liquid crystal layer.

Accordingly, some embodiments of the disclosure further provide a display device including the above-mentioned display panel.

DETAILED DESCRIPTION OF THE EMBODIMENTS

Figure 1:
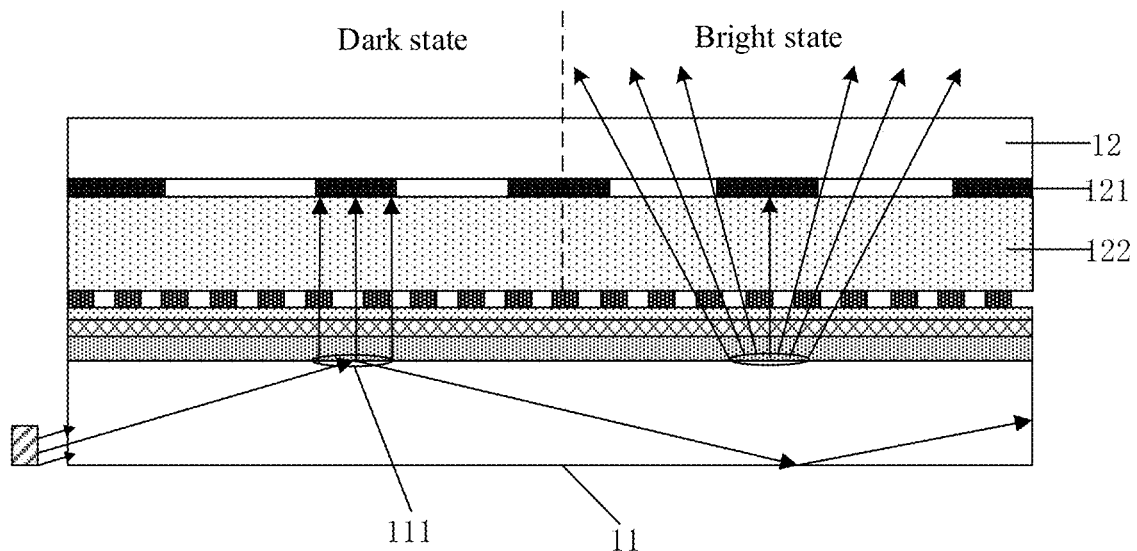
FIG. 1 is a structural schematic diagram of a display device.

A novel liquid crystal display device is shown as FIG. 1, a light guide plate 11 is arranged opposite to a color film substrate 12, and a liquid crystal layer 122 is filled between the light guide plate 11 and the color film substrate 12, when the liquid crystal layer 122 is electrified, deflection angles of liquid crystal molecules are changed so that the transmission direction of light can be changed, and when the liquid crystal layer 122 is not electrified, the deflection angles of the liquid crystal molecules are unchanged so that the transmission directions of the light are unchanged. The light emergent surface of the light guide plate 11 is provided with a plurality of light extraction openings 111, the light emitted from the light source into the light guide plate 11 are transmitted by total reflection in the light guide plate 11 and are only emitted towards the upside when being incident to the light extraction openings 111, parts, located right above all the light extraction openings 111, of a color film layer 121 are provided with light shielding regions, when electric signals are not applied to the liquid crystal layer 122, the light emitted from the light guide plate 11 are emitted towards the light shielding regions located above the light guide plate 11 and are absorbed by a light shielding material, and at the moment, the display of the display panel is in a dark state; due to the application of the electric signals to the liquid crystal layer 122, the refractive index of the liquid crystal layer 122 can be driven to periodically change to form a liquid crystal grating, so that the light emitted from the light extraction openings 111 are emitted towards regions except the light shielding regions after being subjected to the diffraction effect of the liquid crystal grating, and at the moment, the display of the display panel is in a bright state. Due to the application of the different electric signals to the liquid crystal layer 122, the different diffraction efficiencies of the liquid crystal grating to incident light can be achieved, and thus, multi-gray-scale display is realized.

The sizes of the light extraction openings in the light guide plate are limited by the sizes of the light shielding regions corresponding to the light extraction openings, the aperture rates of the display device may be affected by overlarge arrangement sizes of the light shielding regions, and therefore, the lighting effect of the display device is limited by the sizes of the light shielding regions, and the utilization rate of light energy of the display device needs to be increased.

Based on this, some embodiments of the disclosure provide a display panel and a display device in order to increase the utilization rate of light energy of the display device.

In order to make the objectives, technical solutions and advantages of the disclosure clearer, the disclosure is further described in detail below in combination with accompanying drawings, obviously, the described embodiments are a part of embodiments of the disclosure, not all the embodiments. Based on the embodiments of the disclosure, all other embodiments obtained by those of ordinary skill in the art without creative work shall fall within the protection scope of the disclosure.

The display panel and the display device provided by some embodiments of the disclosure are introduced in detail below in combination with the accompanying drawings.

Figure 2:
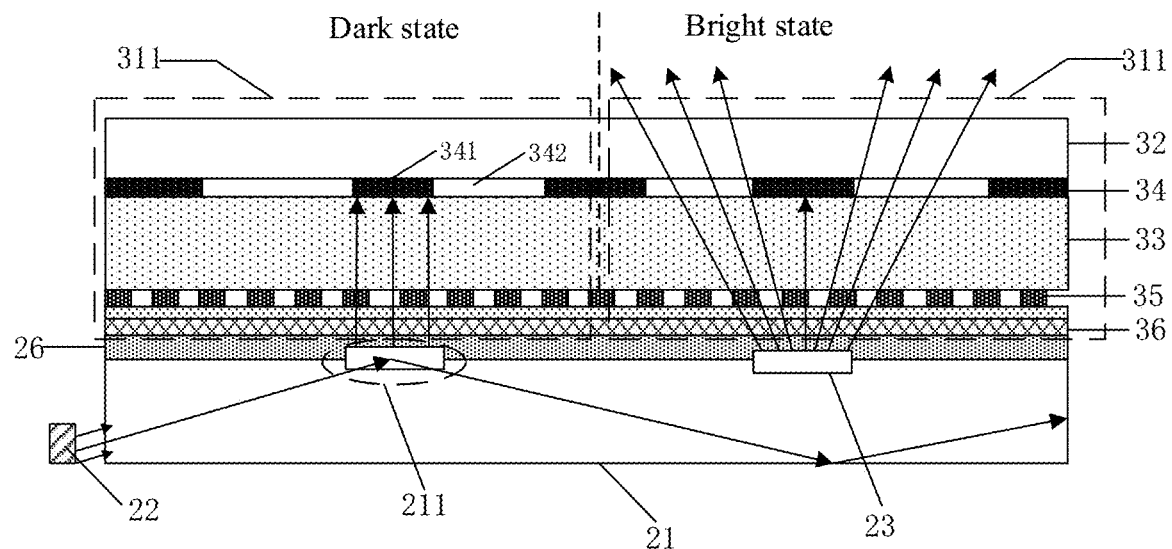
FIG. 2 is a first schematic diagram of a sectional structure of the display panel provided by some embodiments of the disclosure.
Figure 3:
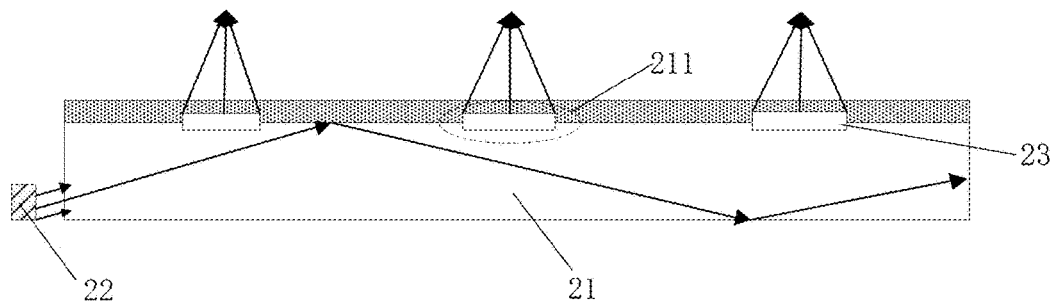
FIG. 3 is a first partial schematic diagram of the display panel in some embodiments of the disclosure.

FIG. 2 is a structural schematic diagram of the display panel provided by some embodiments of the disclosure, FIG. 3 is a structural schematic diagram of a light guide plate in FIG. 2, the display panel includes:

a light guide plate 21, the light guide plate 21 being provided with an upper surface, a lower surface and four end surfaces, the light guide plate 21 including a light incident surface (one of the end surfaces) and a light emergent surface (the upper surface); the light incident surface being one end surface of the light guide plate 21;

an opposite substrate 32, arranged opposite to the light guide plate 21;

a liquid crystal layer 33, located between the light guide plate 21 and the opposite substrate 32;

a light source 22, located on the light incident surface of the light guide plate 21;

a light shielding layer 34, located at the side, facing the liquid crystal layer 33, of the opposite substrate 32; the light shielding layer 34 including a plurality of light shielding regions 341 and light transmitting regions 342;

a plurality of grating light extraction openings 211, the grating light extraction openings 211 being located on the light emergent surface of the light guide plate 21, and each of the grating light extraction openings 211 corresponding to one of the light shielding regions 341;

and the grating light extraction openings 211 being internally provided with light converging elements 23, and the light converging elements 23 being configured to converge light emitted from the light guide plate 21 and make the light emitted from the light guide plate 21 be emitted towards the corresponding light shielding regions 341 when electric signals are not applied to the liquid crystal layer 33.

The above-mentioned display panel provided by some embodiments of the disclosure is applicable to a directional liquid crystal display device. The light emergent surface of the light guide plate of the display panel is provided with the plurality of grating light extraction openings in which the light converging elements are arranged, and the light converging elements are capable of converging the light emitted from the light guide plate and make the light emitted from the light guide plate be emitted towards the corresponding light shielding regions when electric signals are not applied to the liquid crystal layer. Since the light converging elements are located on the positions of the grating light extraction openings of the light guide plate, during specific implementation, when the electric signals are not applied to the liquid crystal layer, the light emitted from all the grating light extraction openings can be converged to the light shielding regions of the display panel, and at the moment, the display of the display panel is in the dark state; under the condition that the electric signals are applied to the liquid crystal layer, the liquid crystal molecules in the liquid crystal layer are overturned under the action of an electric field to make the liquid crystal layer be equivalent to a diffraction grating structure, so that the light originally converged to the light shielding regions are emitted towards the light transmitting regions, and at the moment, the display of the display panel is in the bright state; and due to the application of the different electric signals, the light originally converged to the light shielding regions can be emitted towards the light transmitting regions to different extents, and thus, different gray-scale display can be realized. In the actual application, the light converging elements have an effect of converging the light, and therefore, the sizes of the grating light extraction openings can be increased, the arrangement sizes of the grating light extraction openings are not limited to the sizes of the light shielding regions, so that more light can be emitted from the light guide plate and converged to the light shielding regions, the display brightness can be increased during gray-scale display, and the utilization rate of the light energy can be effectively increased.

Therefore, in the actual application, the areas of orthographic projections of the light shielding regions 341 on the light guide plate 21 may be set to be smaller than the areas of the corresponding grating light extraction openings 211, namely the sizes of the grating light extraction openings 211 may be increased, or the sizes of the light shielding regions may be reduced, so that the display brightness can be increased, and the utilization rate of the light energy of the display panel can be increased.

Optionally, in order to make the emergent light of the display panel be more uniform, the geometrical centers of the orthographic projections of the light shielding regions 341 on the light guide plate 21 may be set to be superposed with the geometrical centers of the corresponding light converging elements 23. In addition, during specific implementation, the geometrical centers of the orthographic projections of the light shielding regions 341 on the light guide plate 21 may also be deviated from the geometrical centers of the corresponding light converging elements 23, such as the situation that the subsequently-mentioned light converging elements are Fresnel lenses, and there are no limits herein.

Figure 4:
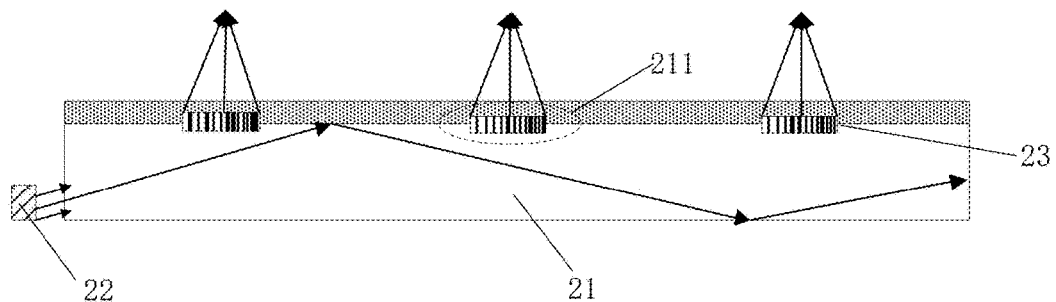
FIG. 4 is a second partial schematic diagram of the display panel in some embodiments of the disclosure.

During specific implementation, in the above-mentioned display panel provided by some embodiments of the disclosure, the light converging elements 23 can realize the effect of converging the light by adopting various ways. In one implementable way, as shown in FIG. 4, the light source 22 is located on one end surface of the light guide plate 21; the above-mentioned light converging elements 23 include first gratings, and the grating periods of the first gratings are not fixed, but are decreased with the increase of distances from the first gratings to the light source.

Figure 5A:
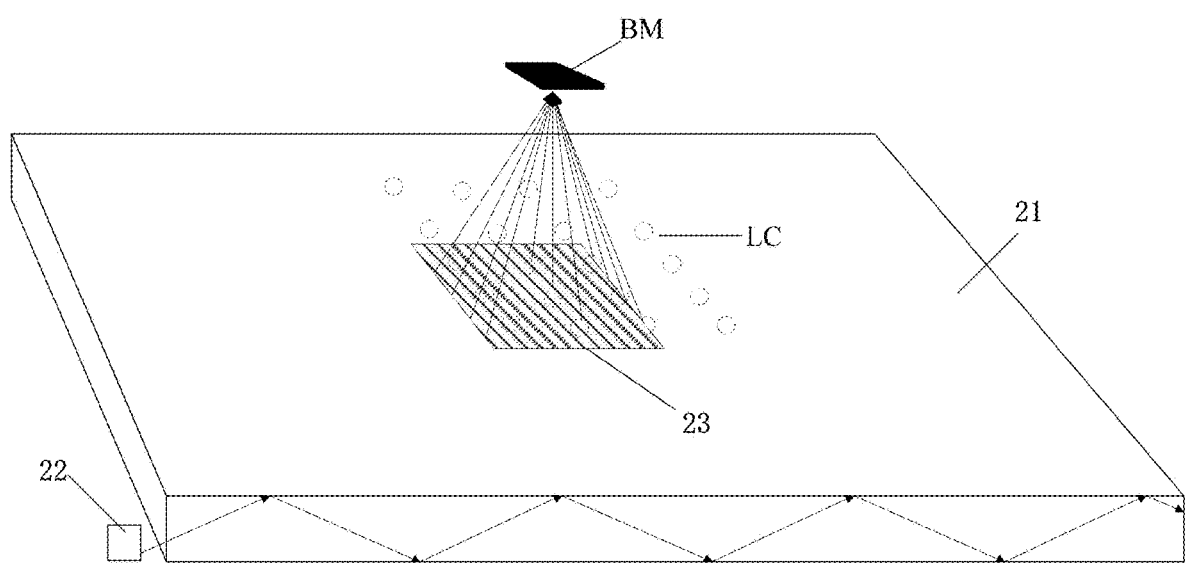
FIG. 5a-FIG. 5b are application schematic diagrams of the display panel in some embodiments of the disclosure.
Figure 5B:
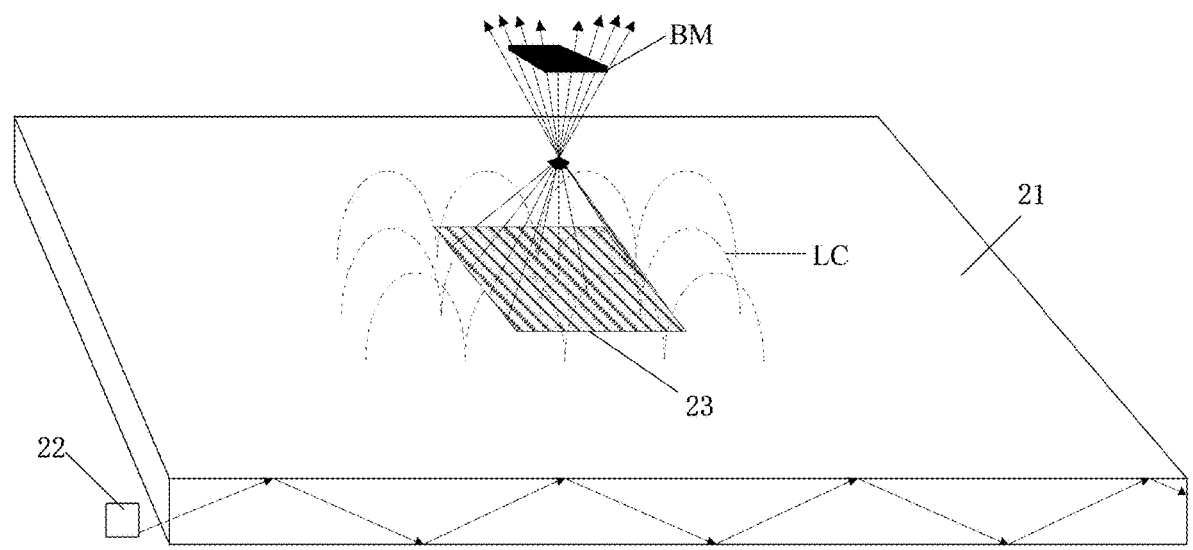

In some embodiments of the disclosure, the above-mentioned first gratings are diffraction gratings of which the grating periods tend to be gradually changed. The size of a diffraction angle on each position of the first gratings is related to the distance from each position to the light source. As shown in FIG. 5a, the first gratings play a role in emitting incident light to the corresponding light shielding regions according to a gradually-changed diffraction angle, and the shorter the distances from the first gratings to the light source are, the smaller the angles, needing to be deflected by the first gratings, of the incident light, namely the diffraction angles, are; and the longer the distances from the first gratings to the light source are, the larger the angles, needing to be deflected by the first gratings, of the incident light, namely the diffraction angles, are, in this way, in order to make the first gratings meet the above-mentioned diffraction rule, the grating periods of the first gratings need to be set to be decreased with the increase of the distances from the first gratings to the light source. As shown in FIG. 5a, under the condition that the electric signals are not applied to the liquid crystal layer LC, the emergent light of the light guide plate can be converged to the light shielding regions BM after passing through the first gratings, and at the moment, the display of the display panel is in the dark state; after the electric signals are applied to the liquid crystal layer LC, the liquid crystal layer LC is equivalent to the diffraction grating structure, as shown in FIG. 5b, the light originally converged to the light shielding regions BM are emitted towards the light transmitting regions at two sides of the light shielding regions BM under the action of a liquid crystal grating, and at the moment, the display of the display panel is in the bright state.

Figure 6:
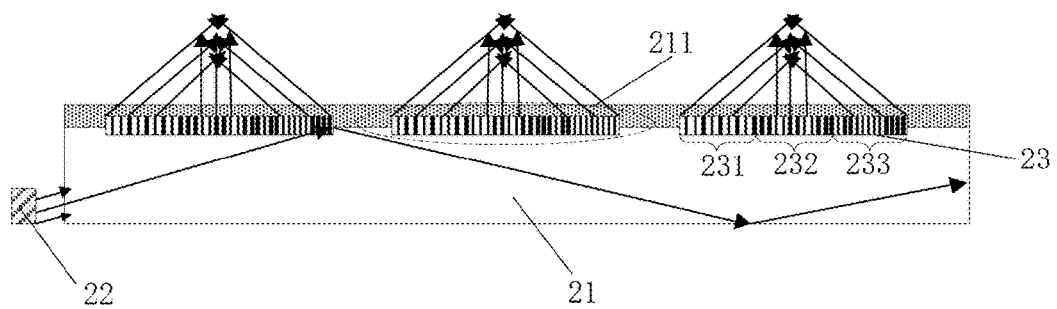
FIG. 6 is a third partial schematic diagram of the display panel in some embodiments of the disclosure.

In the other implementable way, as shown in FIG. 6, the light source 22 is located on one end surface of the light guide plate 21; the above-mentioned light converging elements 23 provided by some embodiments of the disclosure may include at least two second gratings; (such as three second gratings 231, 232 and 233 in FIG. 6), wherein each of grating periods of the at least two second gratings is fixed, and the grating periods of any two of the at least two second gratings are different; and a grating period of one second grating is shorter than a grating period of another second grating, and a distance from the one second grating to the light source is longer than a distance from the another second grating to the light source.

Compared with a way of adopting the first gratings of which the grating periods are gradually changed, a way of combining a plurality of second gratings lies in that the grating period of each of the second gratings is fixed, and the grating periods of the second gratings tend to be gradually changed with the change of the distances from the second gratings to the light source. The second gratings are easier to produce compared with the first gratings, the plurality of combined second gratings and the first gratings have the similar principle of converging the emergent light at the grating light extraction openings, namely the grating periods need to be regulated according to the distances from the gratings to the light source, so that the emergent light passing through the light converging elements can be converged to the positions of the light shielding regions of the display panel, and the descriptions thereof are omitted herein.

Figure 7A:
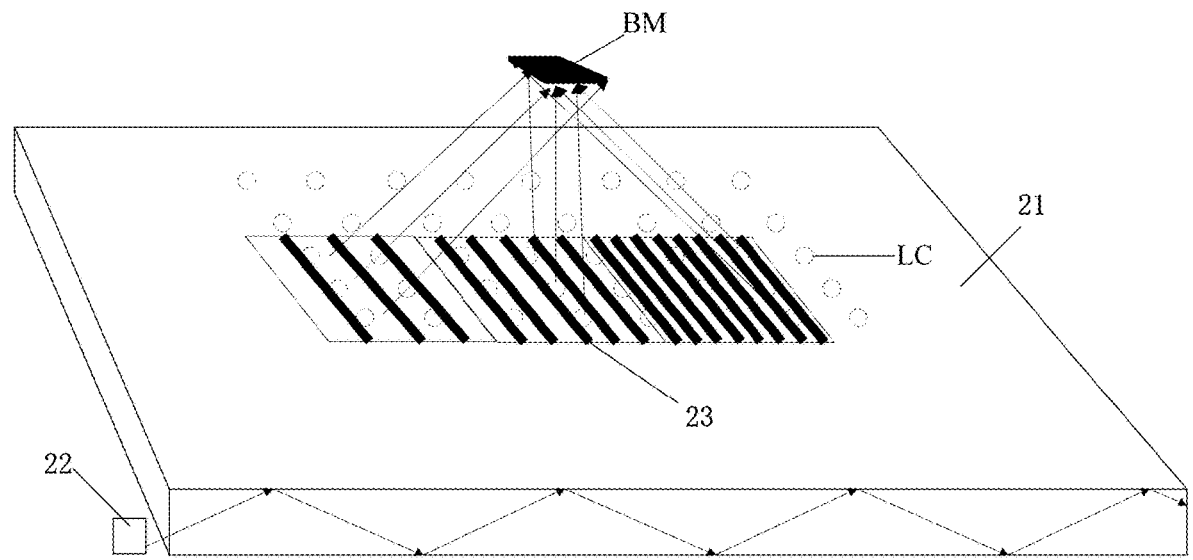
FIG. 7a-FIG. 7b are application schematic diagrams of the display panel in FIG. 6.
Figure 7B:
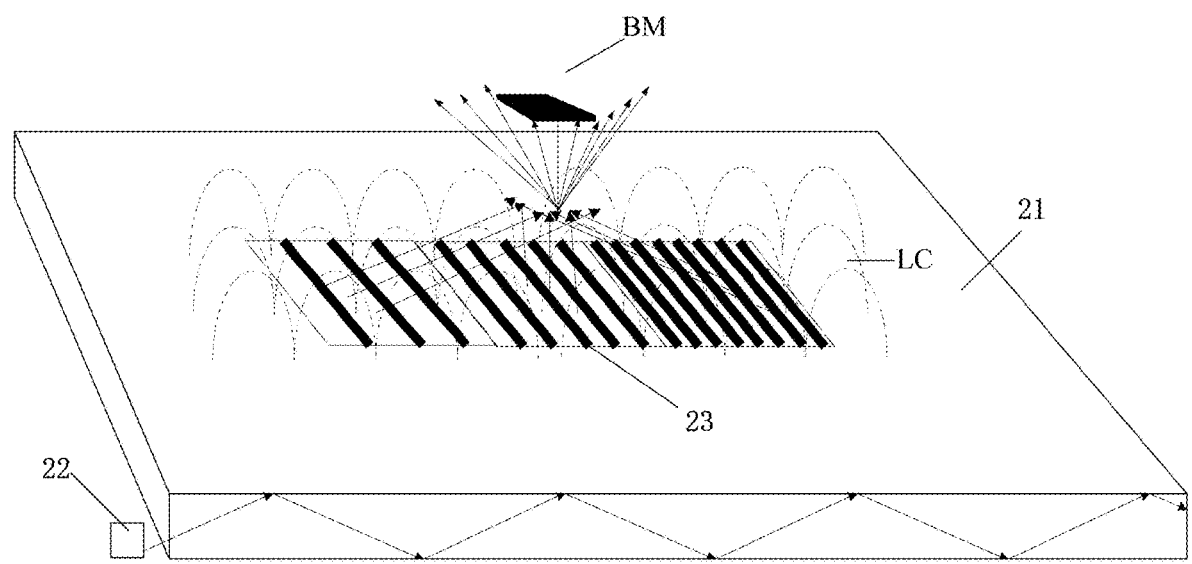

During specific implementation, the light converging elements 23 may include a plurality of second gratings, for example, the light converging elements 23 in FIG. 6 include three second gratings which are respectively represented as 231, 232 and 233, the plurality of second gratings are arranged along the same straight line, and the extension directions of slits of all the second gratings are consistent, for example, in FIG. 6, the three second gratings 231, 232 and 233 are arranged in one row, and the extension directions of slits of the three second gratings 231, 232 and 233 are consistent. The grating period of each of the second grating is fixed, and the grating periods of the second gratings are decreased with the increase of distances from the second gratings to the light source, for example, the second grating 231 is closest to the light source 22 so that the grating period of the second grating 231 is set to be maximum, the second grating 233 is farthest to the light source 22 so that the grating period of the second grating 233 is set to be minimum, while the grating period of the second grating 232 located between the second gratings 231 and 233 may be an intermediate value of the grating periods of the second gratings at two sides. The extension direction of the light transmitting slit of each of the second gratings is vertical to the row direction of the arrangement of the three second gratings. When the electric signals are not applied to the liquid crystal layer LC of the display panel, as shown in FIG. 7a, the emergent light of the grating light extraction openings are converged to the light shielding regions BM above the grating light extraction openings due to the diffraction effects of the three second gratings 231, 232 and 233, and at the moment, the display of the display panel is in the dark state; and after the electric signals are applied to the liquid crystal layer LC, as shown in FIG. 7b, the liquid crystal layer LC is equivalent to the diffraction grating structure, the light originally converged to the light shielding regions BM can be emitted towards the light transmitting regions at two sides of the light shielding regions BM under the action of the liquid crystal grating, and at the moment, the display of the display panel is in the bright state. Due to the application of the different electric signals to the liquid crystal layer LC, the light originally converged to the light shielding regions BM can be emitted towards the light transmitting regions at two sides to different extents, and thus, different gray-scale display is realized.

During specific implementation, in the above-mentioned light converging elements with the above-mentioned structures, the total length of the three second gratings is 6 um, the grating periods can be set at 200-500 nm, the heights of the gratings can be set at 200-500 nm, and a good light converging effect is achieved when the duty ratio is set at 30-70%.

Optionally, in some embodiments of the disclosure, the above-mentioned display panel may include a plurality of sub-pixel units.

Figure 8:
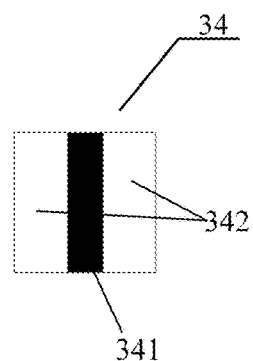
FIG. 8 is a first schematic diagram of a structure, viewed from the top, of a light shielding layer provided by some embodiments of the disclosure.

FIG. 8 is a partial schematic diagram of a light shielding layer 34 corresponding to one of the sub-pixel units; referring to FIG. 8 and combining to FIG. 4 and FIG. 6, the sub-pixel unit includes a light shielding region 341 and light transmitting regions 342 at two sides of the light shielding region 341; and the arrangement directions of the light shielding region 341 and the light transmitting regions 342 in the sub-pixel unit are consistent to the direction from the light source 22 to sub-pixels.

In other words, in one of the sub-pixel units, when the light transmitting regions 342 are located at two sides of the light shielding region 341, the light converging elements 23 arranged in the grating light extraction openings corresponding to the sub-pixel unit may be the first gratings shown as FIG. 4 or the plurality of second gratings arranged in a row in FIG. 6. The principle of converging the light can refer to above-mentioned relevant parts corresponding to FIG. 4 and FIG. 6, and the descriptions thereof are omitted herein. The grating periods of the first gratings are gradually changed, the light transmitting slits of the first gratings may be arranged in the extension direction of the strip-shaped light shielding region in FIG. 8. While the plurality of second gratings can be arranged in a row in the extension direction vertical to the extension direction of the strip-shaped light shielding region in FIG. 8, and the light transmitting slits of all the second gratings can be arranged in the extension direction of the light shielding regions.

However, when the plurality of second gratings are arranged by adopting the structure as shown in FIG. 6, all the second gratings are arranged in one row, and the light transmitting slits of all the second gratings extend in the same direction, so that the gratings originally converged to the light shielding regions BM can only be emitted towards two sides of the light shielding regions BM after the electric signals are applied to the liquid crystal layer, and then, when the display panel is watched, the display content of the display panel can only be clearly seen along two sides of the light shielding regions BM, but the display panel cannot be watched in other directions, which results in a relatively small display view angle.

For this purpose, during specific implementation, the plurality of second gratings may also be arranged in at least two rows, and thus, the emergent light of the grating light extraction openings can be incident to the light shielding regions BM at diffraction angles in different directions after being diffracted by all the second gratings, and then, the light emitted towards the light transmitting regions can be emitted in both row and column directions after being diffracted by the liquid crystal grating, so that the display view angle is expanded.

Optionally, in order to ensure that the display panel can emit the light in a multi-dimensional direction, in some embodiments of the disclosure, in the light converging elements, one of the second gratings is used as a center, and other second gratings are uniformly arranged around the second grating located in the center, and the light converging elements including nine second gratings are illustrated below.

Figure 9A:
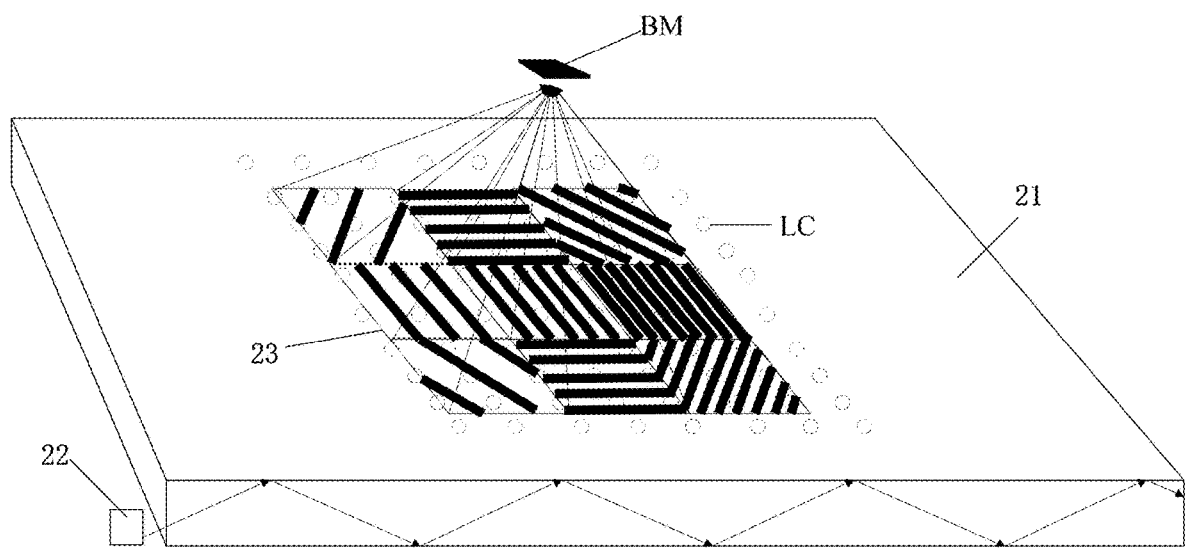
FIG. 9a-FIG. 9b are application schematic diagrams when the display panel provided by some embodiments of the disclosure includes nine second gratings.
Figure 9B:
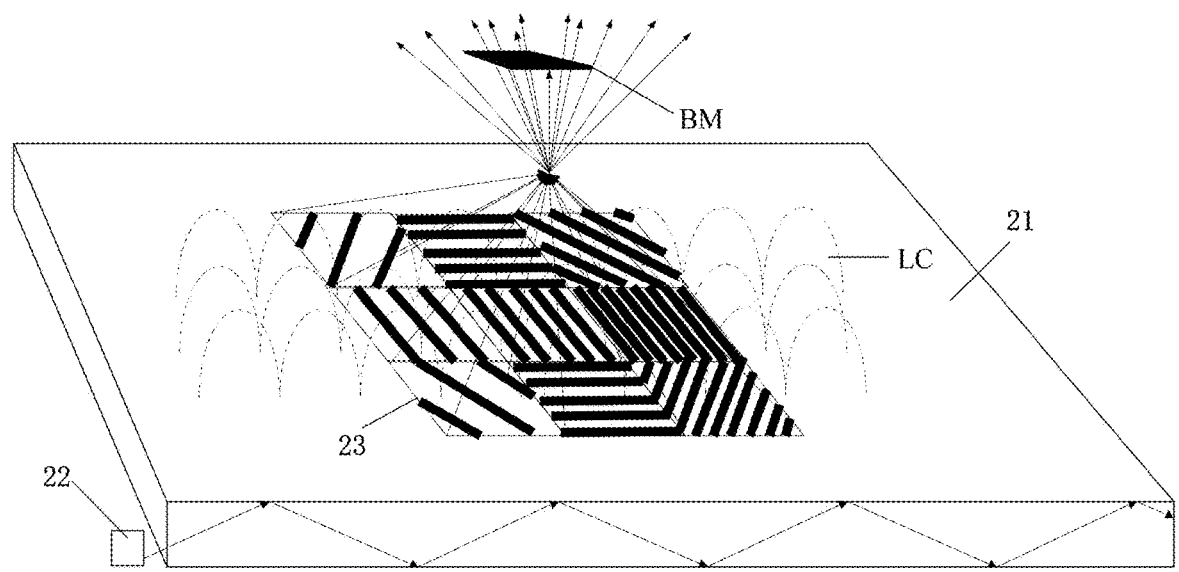

For example, as shown in FIG. 9a and FIG. 9b, the light converging elements 23 include nine second gratings, the nine second gratings are arranged in three rows and three columns; and the extension directions of slits of every two second gratings symmetric relative to the second grating located in the center are consistent. As shown in FIG. 9a and FIG. 9b, the light transmitting slits of the nine second gratings do not extend in the same direction, but respectively and symmetrically extend in a row direction, a column direction and a diagonal direction, in this way, when the electric signals are not applied to the liquid crystal layer LC, as shown in FIG. 9a, the emergent light of the grating light extraction openings are incident to the positions where the light shielding regions BM are located at the diffraction angles in the different directions after being diffracted by all the second gratings, so that the display of the display panel is in the dark state; and when the electric signals are applied to the liquid crystal layer LC, as shown in FIG. 9b, the liquid crystal layer LC is equivalent to a diffraction grating, so that the light originally incident to the light shielding regions BM are emitted towards the light transmitting regions around the light shielding regions BM, so that the display of the display panel is in the bright state. Due to the adoption of the structures of the light converging elements as shown in FIG. 9a and FIG. 9b, the light can be emitted in the multi-dimensional direction, so that the visible range of the display panel is widened.

In the above-mentioned display panel provided by some embodiments of the disclosure, different from a simple diffracted ray, various forms of gratings located in the grating light extraction openings lie in that the directions of the diffracted light and the directions of the incident light are not located on the same plane, and therefore, the accuracy of the emergent directions of the diffracted light can be guaranteed only by considering the vector properties of the light and precisely designing the periodical rotation directions (namely the vectors of the gratings) of the gratings when the gratings are designed.

The design of the gratings in the grating light extraction openings should be based on a holographic optical principle, parallel straight interference fringes will be obtained after two beams of plane waves with different wave vector directions interfere, the parallel straight interference fringes are a group of diffraction gratings, the density of the interference fringes represents the periods of the gratings, the rotation directions of the interference fringes represent the rotation directions of the gratings, and therefore, the grating vectors of a group of gratings can be determined.

Figure 10:
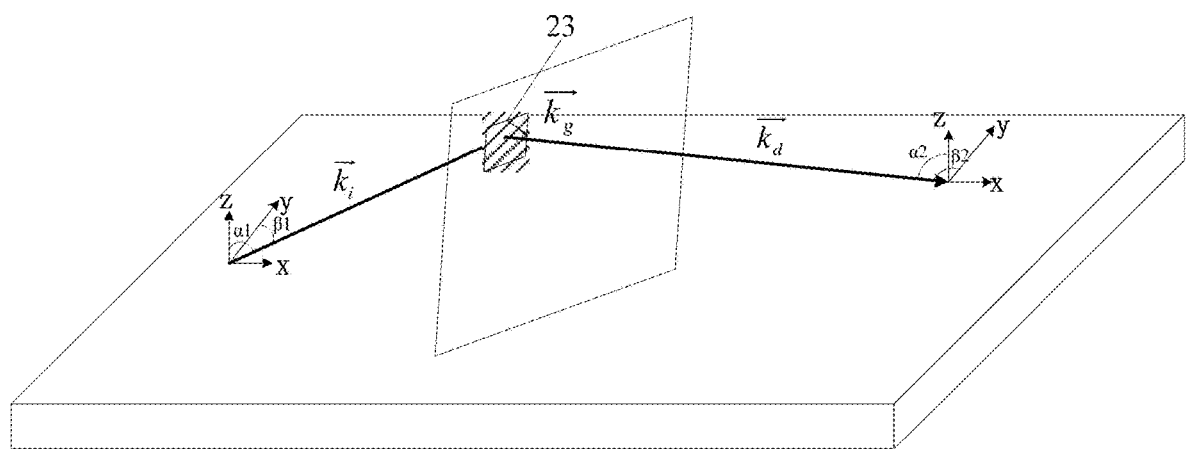
FIG. 10 is a design schematic diagram of a grating vector in some embodiments of the disclosure.

As shown in FIG. 10 which is a design schematic diagram of a grating (23) in one of the grating light extraction openings, $\vec{k}_i$ is a wave vector of an incident light beam, $\vec{k}_d$ is a wave vector of a diffracted emergent light beam, and $\vec{k}_g$ is grating vector (including the period and rotation direction of the grating) of the grating. A light beam transmitted in the light guide plate is the incident light beam, may be regarded as a plane wave relative to a grating opening and may be expressed as:

$$U_i(\vec{r}) = A_i(\vec{r})\exp(-i\vec{k}_i \cdot \vec{r});$$

a diffracted light beam emitted from the grating may be expressed as:

$$U_d(\vec{r}) = A_d(\vec{r})\exp(-i\vec{k}_d \cdot \vec{r});$$

wherein $A_i(\vec{r})$ and $A_d(\vec{r})$ are respectively amplitudes of an incident light wave and a diffracted light wave, and $\vec{k}_i$ and $\vec{k}_d$ are respectively wave vectors of the incident light wave and the diffracted light wave.

The direction of the wave vector is the propagation direction of the plane wave, and the wave vector meets the formula:

$$k = n\frac{2\pi}{\lambda},$$

wherein n is a refractive index of a medium where the wave vector is located. Therefore, the vector property of the grating is: $\vec{k}_d = \vec{k}_i - \vec{k}_g$;

wherein the vector $\vec{k}_g$ of the grating meets the formula: $|\vec{k}_g| = 2\pi/\Lambda$, and $\Lambda$ represents a grating period.

The grating period may be expressed as:

$$\frac{1}{\Lambda_z} = \frac{n_1\cos\alpha_1 - n_2\cos\alpha_2}{\lambda};$$

$$\frac{1}{\Lambda_y} = \frac{n_1\cos\beta_1 - n_2\cos\beta_2}{\lambda};$$

wherein $\Lambda_z$ and $\Lambda_y$ respectively represent components of the grating period in z and y directions; $n_1$ is a refractive index of a medium where the incident light wave is located, and $n_2$ is a refractive index of a medium where the emergent light wave is located; and $\alpha_1$ and $\beta_1$ are included angles of the incident light wave relative to the z axis and the y axis; and $\alpha_2$ and $\beta_2$ are included angles of the diffracted light wave relative to the z axis and the y axis.

According to the above-mentioned two formulae, the grating period can be expressed as:

$$\Lambda = \sqrt{\frac{\lambda^2}{(n_1\cos\alpha_1 - n_2\cos\alpha_2)^2 + (n_1\cos\beta_1 - n_2\cos\beta_2)^2}};$$

the rotation direction φ of the grating can be determined by the following formula:

$$\varphi = \frac{\Lambda_z}{\Lambda_y} = \frac{n_1\cos\beta_1 - n_2\cos\beta_2}{n_1\cos\alpha_1 - n_2\cos\alpha_2};$$

so far, basic parameters of the grating vector can be obtained, with regard to the diffraction efficiency of the grating, the required diffraction efficiency can be obtained by selecting an appropriate grating material and optimizing the height and duty ratio of the grating according to a rigorous coupled wave theory.

Figure 11:
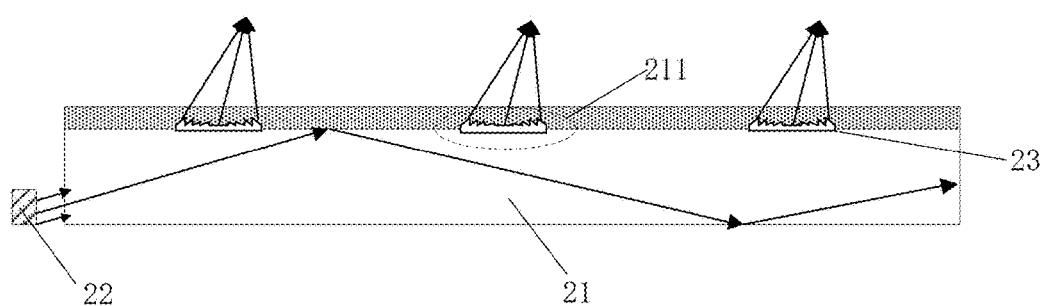
FIG. 11 is a fourth partial schematic diagram of the display panel in some embodiments of the disclosure.

In another implementable way, as shown in FIG. 11, the above-mentioned light converging elements 23 provided by some embodiments of the disclosure can include Fresnel lenses.

The Fresnel lenses play a relatively strong role in converging the incident light and are lower in material consumption as comparison with traditional converging lenses, in some embodiments of the disclosure, the converging lenses are required to have relatively small focal lengths if the converging lenses are adopted to converge the emergent light of the grating light extraction openings, the large thickness will be certainly required if the traditional lenses are used, while the lenses can be lighter and thinner under the condition of same focal length if the Fresnel lenses are adopted, meanwhile, the usable apertures of the Fresnel lenses are larger, so that more light can be transferred, and furthermore, the utilization rate of the light energy can be favorably increased. During specific implementation, the emergent light of the light guide plate are not vertically incident to the Fresnel lenses, so that the converged light spots of the Fresnel lenses may be deviated from the optical axes of the Fresnel lenses, and at the moment, the light shielding regions BM in the display panel need to be movably arranged towards the positions of the light spots.

Optionally, in some embodiments of the disclosure, the above-mentioned display panel may include a plurality of sub-pixel units.

Figure 12:
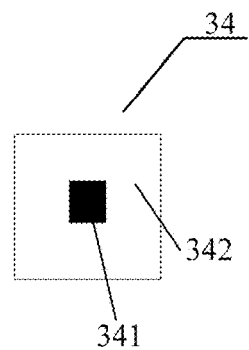
FIG. 12 is a second schematic diagram of the structure, viewed from the top, of the light shielding layer provided by some embodiments of the disclosure.

FIG. 12 is partial schematic diagram of the light shielding layer 34 corresponding to one of the sub-pixel units; and referring to FIG. 12 and combining with FIG. 9*a*, FIG. 9*b* and FIG. 11, the sub-pixel unit includes a light shielding region 341 and a light transmitting region 342 arranged around the light shielding region 341.

In other words, in one of the sub-pixel units, when the light transmitting region 342 is arranged around the light shielding region 341, the light converging elements corresponding to the sub-pixel unit may include a plurality of second gratings, for example, the light converging elements may be a plurality of second gratings which are arranged in at least two rows, or arranged in a manner that one of the second gratings is used as the center and other second gratings are arranged around the second grating located in the center, for example, the second gratings may be arranged to form the structure as shown in FIG. 9*a* and FIG. 9*b*, the nine second gratings are arranged to form a three-row and three-column structure, the light in the row direction, the column direction and the diagonal direction may be converged on positions where the light shielding regions 341 located above are located, during bright-state display, the light may be emitted towards a plurality of directions to widen the view angle, the principle thereof can refer to relevant parts corresponding to FIG. 9*a* and FIG. 9*b*, and the descriptions thereof are omitted herein. In addition, as shown in FIG. 11, when the light transmitting region 342 is arranged around the light shielding region 341 in one of the sub-pixel units, the light converging element corresponding to the sub-pixel unit can also be the Fresnel lens.

Figure 16:
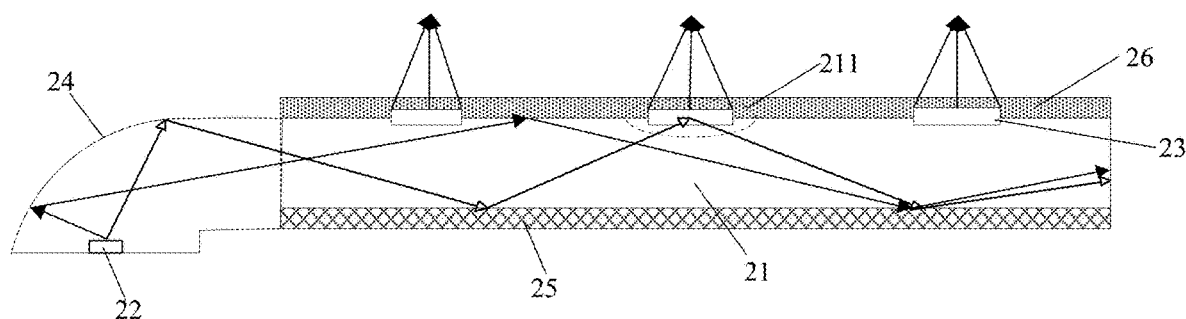
FIG. 16 is a sixth partial schematic diagram of the display panel in some embodiments of the disclosure.

During specific implementation, the light source in the display panel may adopt a light emitting diode (LED) or a miniature light emitting diode (Micro-LED) and the like. The light guide plate is made of a transparent material, for example, the transparent material including indium thin oxide (ITO) or silicon nitride (Si3N4) and the like can be selected, and the thickness of the light guide plate can be set at 1 mm and even dozens of microns. Light emitted from the LED are in Lambert distribution when the LED is adopted as a light source of a backlight module, and therefore, in some embodiments of the disclosure, as shown in FIG. 13 and FIG. 16, the above-mentioned display panel may further include a coupling element 24 located at the light emergent side of the light source 22 and the light incident surface of the light guide plate 21;

and the coupling element 24 is configured to couple the emergent light of the light source 22 into the light guide plate at an incident angle meeting a total reflection condition of the light guide plate 21.

Figure 13:
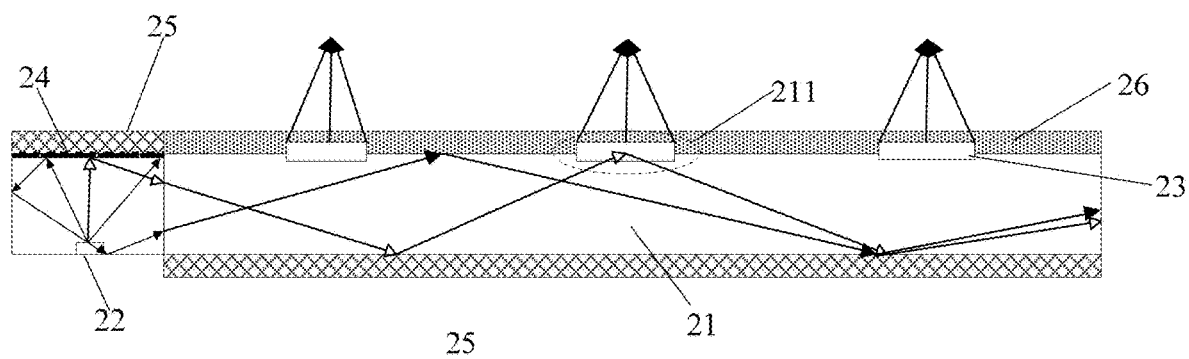
FIG. 13 is a fifth partial schematic diagram of the display panel in some embodiments of the disclosure.

As shown in FIG. 13, the above-mentioned coupling element 24 is a reflection grating such as a metal reflection grating and may optionally be an aluminum reflection grating. The metal reflection grating performs reflection and diffraction modulation on the light which are emitted by the LED and in Lambert distribution, and finally, the reflected light meet the condition of total reflection transmission in the light guide plate. Compared with a grating made of other media under the same condition, the metal reflection grating is capable of doubling the coupling light effect due to the reflection effect.

Known according to a total reflection law, the total reflection angle meets the following formula:

$$\theta_c = \arcsin\left(\frac{n}{n_1}\right);$$

wherein n represents the refractive index of the light guide plate, and $n_1$ represents the refractive index of a medium except the light guide plate.

According to the metal reflection grating structure adopted in some embodiments of the disclosure, the light are sensitive to an incident angle, and therefore, performing diffraction modulation on all the light ranging from +60 DEG to −60 DEG by using the gratings with the same period structure to reach a design objective cannot be realized.

Figure 14:
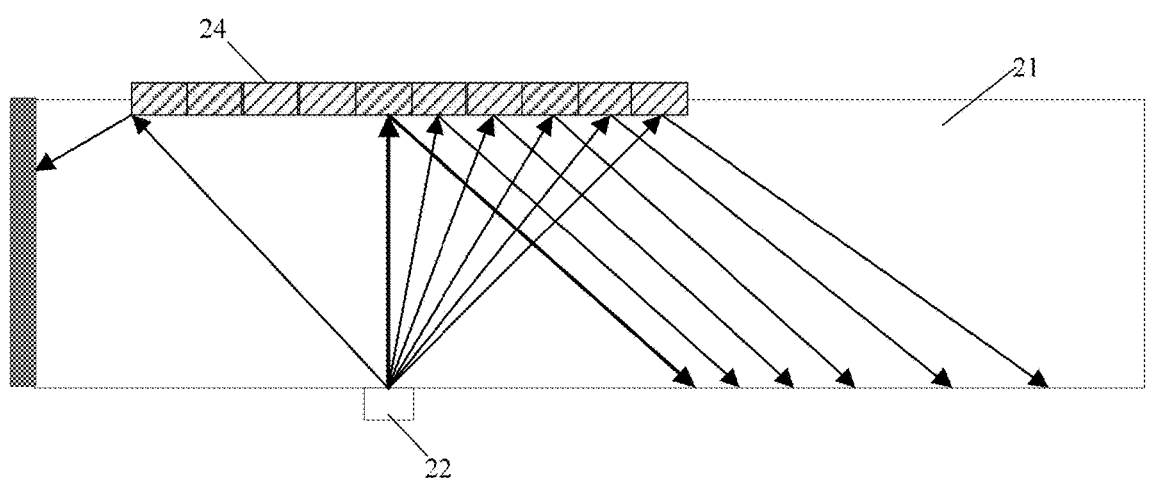
FIG. 14 is a first design schematic diagram of a reflection grating provided by some embodiments of the disclosure.

Therefore, a regional design mode may be adopted in some embodiments of the disclosure, namely the projection areas of the light emitted from the LED are partitioned into N parts, all parts correspond to different light emitting angles of the LED, and a grating structure is optimized for a main ray in each part of projection area, so that the grating diffraction coupling modulation effects of all parts are about the same angle (the angle meeting the total reflection condition). In other words, the above-mentioned metal reflection grating provided by some embodiments of the disclosure is composed of several small gratings with different parameters. FIG. 14 is a schematic diagram of a cross-section diagram of the regional design of the metal reflection grating 24. When the grating is regionally and optimally designed, it should be ensured that all multi-angle light incident to each small region of the metal reflection grating 24 can be efficiently subjected to diffraction modulation to meet the total reflection condition. Therefore, a certain relationship exists between the thickness of the light guide plate 21 and the size of the light source, the higher the thickness of the light guide plate 21 is, the smaller the angle of the light incident to the metal reflection grating is, and therefore, diffraction modulation is easier to perform. In the actual application, the relationship that the ratio of the size of the light source 22 to the thickness of the light guide plate 21 is 1/10 can be guaranteed, the grating structure is designed once every other 5 DEG according to the light emitting angle of the light source, so that all the light with the range of +/−2.5 DEG on the basis of the incident angle in the grating structure meet the total reflection diffraction, and meanwhile, it is ensured that the diffraction efficiency cannot be reduced.

Figure 15:
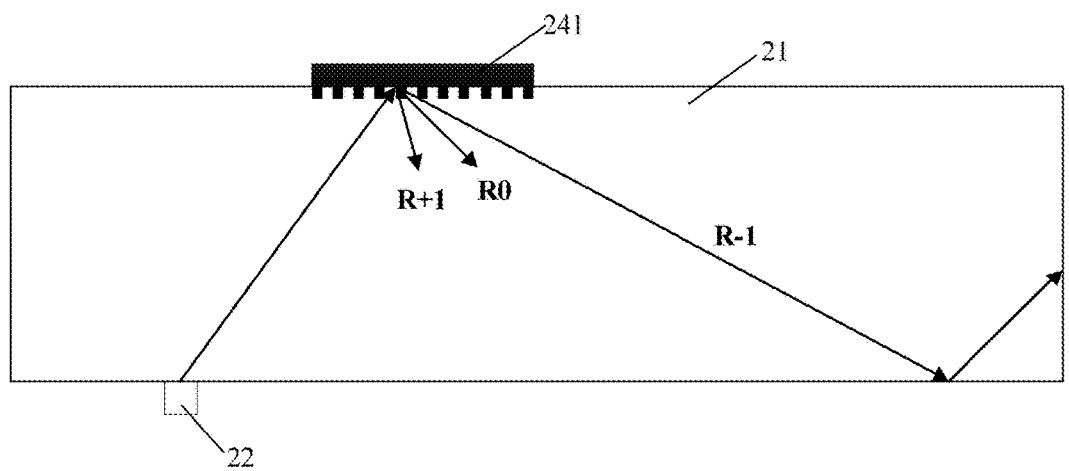
FIG. 15 is a second design schematic diagram of the reflection grating provided by some embodiments of the disclosure.

The metal reflection grating provided by some embodiments of the disclosure may include the following two forms: firstly, a packing medium is a material of which the refractive index is the same as that of a light guide plate medium; and secondly, a filling material is air. As shown in FIG. 15, FIG. 15 shows a metal reflection grating unit 241 which is a small part of the metal reflection grating. The parameters for optimizing the metal reflection grating unit 241 include the period, groove depth, the duty ratio and the like of the grating, so that the negative level-1 angle of the diffracted ray of the optimized metal reflection grating is a certain angle (the angle meeting the total reflection condition), and meanwhile, it is ensured that the negative level-1 (R-1 level) energy is highest.

According to the above-mentioned design rule, a simulation experiment is performed, a wavelength is selected, namely $\lambda=532$ nm, the grating is designed once every other 5 DEG, the main design diffraction angle is 65 DEG, and a design result of a metal reflection grating layer of which the metal material adopts aluminum is as follows:

when the refractive index of the packing medium in the metal reflection grating is the same as that of the material of the light guide plate, the simulation result is shown as table I.

TABLE I

| Angle/° | Period nm | Height nm | Dutynratio % | Efficiency % | Diffraction angle range/° | Stray light angle range/° |
|---|---|---|---|---|---|---|
| 5 | 430 | 105 | 53 | 36.2 | 61-75 | 30-37; 3-8 |
| 10 | 480 | 107 | 57 | 44.2 | 61-75 | 30-37; 8-13 |
| 15 | 545 | 89 | 58 | 55.6 | 61-74 | 19-25; 13-18 |
| 20 | 625 | 91.7 | 58.5 | 48.4 | 61-74 | 10-15; 48-55; 18-23 |
| 25 | 730 | 102.5 | 41.5 | 50.1 | 61-73 | 0-5; 30-35; 23-28 |
| 30 | 860 | 112.3 | 52.7 | 50.8 | 61-73 | 3-8; 16-20; 28-33 |
| 35 | 1060 | 105.3 | 61.3 | 45.8 | 61-72 | 12-17; 3-7; 33-38 |
| Total | | | | 48.7 | 61-75 | 0-37; 48-55; 0-38 | when the packing medium in the metal reflection grating is the air, the simulation result is shown as table II.

TABLE II

| Angle/° | Period nm | Height nm | Duty ratio % | Efficiency % | Diffraction angle range | Stray light angle range/° |
|---|---|---|---|---|---|---|
| 5 | 430 | 140 | 62 | 45.8 | 61-75 | 30-37; 3-8 |
| 10 | 480 | 140 | 63 | 50 | 61-75 | 30-37; 8-13 |
| 15 | 545 | 186 | 64 | 49.4 | 61-74 | 19-25; 13-18 |
| 20 | 625 | 180 | 48.7 | 50.2 | 61-74 | 10-15; 48-55; 18-23 |
| 25 | 730 | 204 | 47.3 | 50.7 | 61-73 | 0-5; 30-35; 23-28 |
| 30 | 860 | 223 | 57 | 50.85 | 61-73 | 3-8; 16-20; 28-33 |
| 35 | 1060 | 261 | 44.4 | 49.3 | 61-72 | 12-17; 3-7; 33-38 |
| Total | | | | 49.5 | 61-75 | 0-37; 48-55; 0-38 |

The reason of adopting the diffraction angle range instead of a fixed diffraction angle in the above-mentioned two tables is that although the designed main diffraction angle is 65 DEG, the incident angles of all grating units cannot be guaranteed to be same, but should be changed within the range of +/−2.5 DEG due to the sensitiveness of the grating to the incident angle and the consideration of the light emitting characteristic of the LED (the light source). All the angles within the above-mentioned diffraction angle range meet the total reflection condition and conform to the design objective.

The parameters of the grating in the above-mentioned design are simulation results taking the production process difficulty into consideration, a two-step structural grating is only adopted, and the coupling efficiency can be further increased by 20% or above if a four-step or more-step grating is designed.

In addition, as shown in FIG. 16, the above-mentioned coupling element 24 may be a freeform reflecting mirror. A freeform surface can select a paraboloid or a spherical surface, but an included angle of the optical axis of the freeform surface and the light emergent surface of the light guide plate may be smaller than or equal to 50 DEG, in this way, the reflection angles of the light emitted from the light source may be smaller than 10 DEG, and therefore, the angles of the emergent light meet the total reflection angle of the light guide plate. Meanwhile, in order to guarantee the maximum effect of the utilizable light coupled into the light guide plate and the uniformity of the light emitted from the grating light extraction openings, the relative positions of the light guide plate and the freeform surface are also required to be reasonably designed.

As shown in the above-mentioned simulation results, although the utilization rate of the light energy of the light source can be increased by arranging the coupling element at the light emergent side of the light source, there still exists part of stray light that cannot meet the total reflection condition of the light guide plate, and therefore, in some embodiments of the disclosure, as shown in FIG. 13 and FIG. 16, an absorption layer 25 for absorbing the stray light is arranged on the lower surface of the light guide plate and the opposite surface of the side, deviated from the light source, of the metal reflection grating, so that disturbance of the stray light to the backlight is avoided. In addition, the surface of the light emergent surface of the light guide plate may also be provided with a flattening layer 26 playing roles in protecting the light converging elements 23 and flattening so as to be beneficial to the subsequent production of the display panel. In order to ensure that the light in the light guide plate meet the total reflection condition, the refractive index of the flattening layer 26 should be smaller than the refractive index of the light guide plate, and the thickness of the flattening layer 26 may be set to be larger than or equal to 1 micron.

Optionally, the above-mentioned display panel provided by some embodiments of the disclosure further includes a transparent conductive structure (a first transparent electrode 35 and a second transparent electrode 36 as shown in the figure);

and the transparent conductive structure is configured to make the liquid crystal layer 33 be equivalent to a diffraction grating structure under the control of the electric signals so that the light emitted from the light converging elements 23 are emitted towards the corresponding light transmitting regions 341 through the diffraction grating structure.

Figure 17:
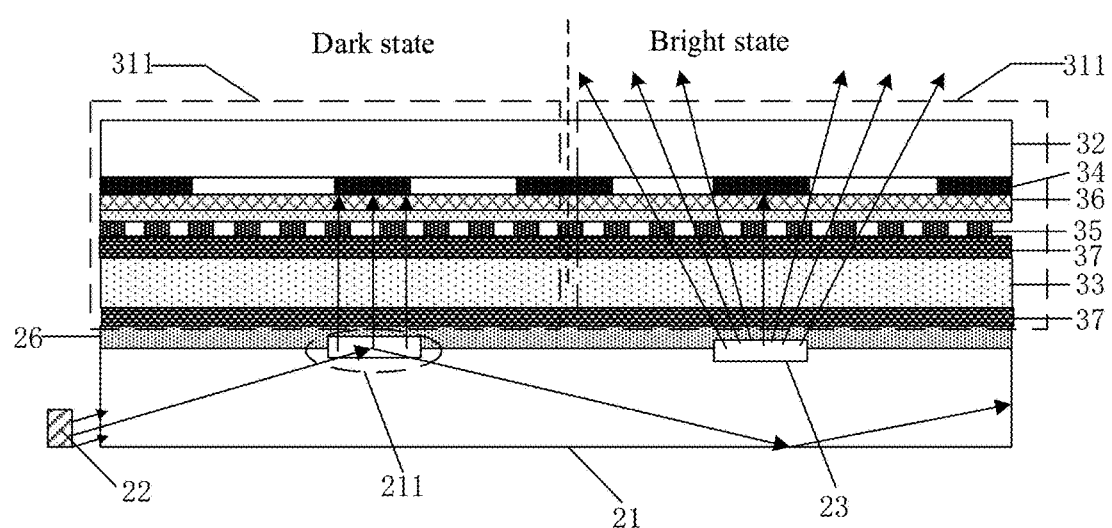
FIG. 17 is a second schematic diagram of the sectional structure of the display panel provided by some embodiments of the disclosure.

During specific implementation, the above-mentioned transparent conductive structure may include the first transparent electrode 35 and the second transparent electrode 36; the first transparent electrode 35 may be a pixel electrode, the second transparent electrode 36 may be a common electrode, and an insulating layer may be arranged between the first transparent electrode 35 and the second transparent electrode 36. The positions of the first transparent electrode 35 and the second transparent electrode 36 may be flexibly arranged, for example, as shown in FIG. 2, the first transparent electrode 35 and the second transparent electrode 36 may be arranged between the opposite substrate 32 and the liquid crystal layer 33; or as shown in FIG. 17, the first transparent electrode 35 and the second transparent electrode 36 may also be arranged between the liquid crystal layer 33 and the light guide plate 21. In addition, the first transparent electrode 35 and the second transparent electrode 36 may also be respectively arranged at two sides of the liquid crystal layer 33, and there are no limits herein.

When the first transparent electrode 35 and the second transparent electrode 36 are arranged at the same side of the liquid crystal layer 33, a horizontal electric field can be generated by applying the electric signals to the first transparent electrode 35 and the second transparent electrode 36, and compared with the refractive index under the situation that the first transparent electrode 35 and the second transparent electrode 36 are respectively arranged at two sides of the liquid crystal layer 33, the refractive index of the liquid crystal grating generated after the electric signals are applied to the transparent electrodes arranged at the same side of the liquid crystal layer 33 is changed better. In addition, an existing nano-imprint technology may only be used for producing samples smaller than 8 inches, while a production process for the transparent electrodes cannot be used after the nano-imprint technology is completed, and therefore, both the first transparent electrode 35 and the second transparent electrode 36 may be arranged at one side of a color film layer 34.

Further, as shown in FIG. 17, two sides of the liquid crystal layer 33 may also be provided with oriented films 37 for initially orientating the liquid crystal molecules in the liquid crystal layer 33. A liquid crystal in the liquid crystal layer 33 may adopt a nematic-phase liquid crystal or other liquid crystals and has the thickness set to be 0.1-10 microns so as to be beneficial to formation of the liquid crystal grating under the drive of the electric field.

Figure 18:
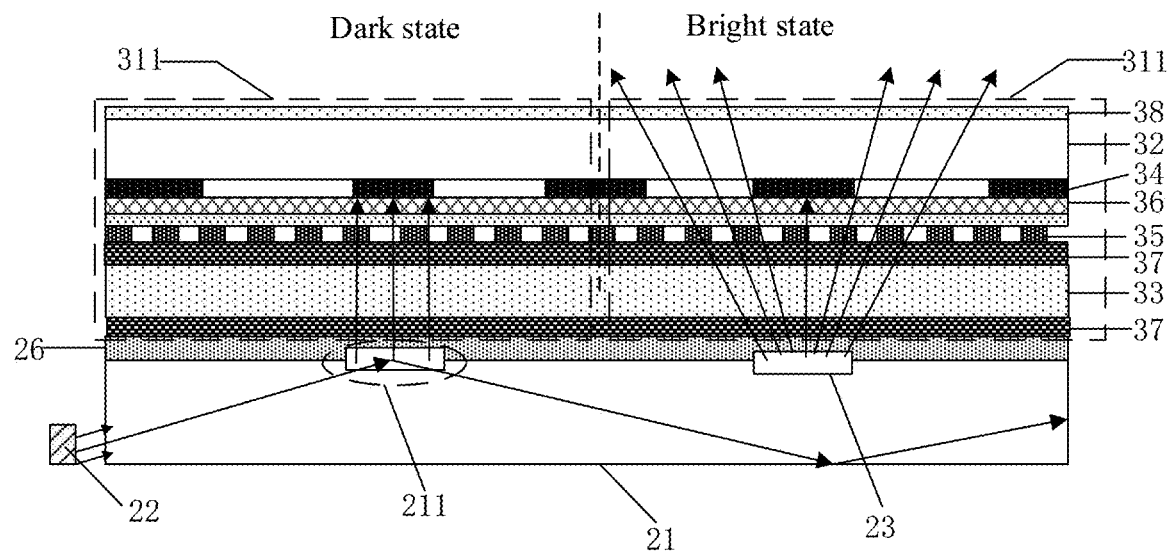
FIG. 18 is a third schematic diagram of the sectional structure of the display panel provided by some embodiments of the disclosure.
Figure 19:
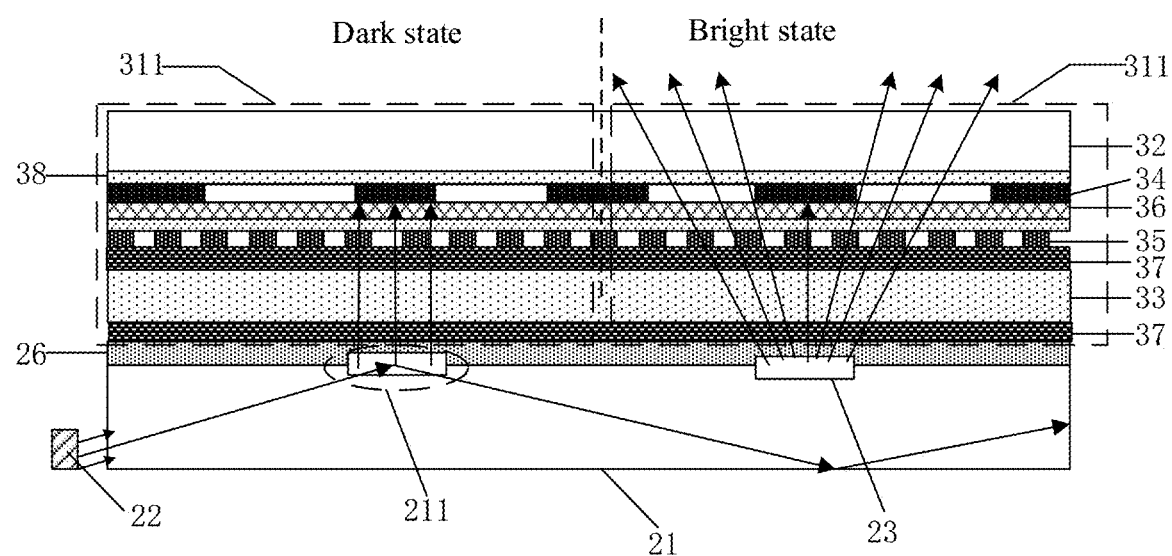
FIG. 19 is a fourth schematic diagram of the sectional structure of the display panel provided by some embodiments of the disclosure.

As shown in FIG. 18 and FIG. 19, the light emergent side of the light shielding layer 34 may also be provided with a scattering layer 38. As shown in FIG. 18, the scattering layer may be located on the surface of the side, deviated from the light shielding layer 34, of the substrate 32; or as shown in FIG. 19, the scattering layer 38 may also be located between the substrate 32 and the light shielding layer 34. The above-mentioned display device provided by some embodiments of the disclosure is in a directional display mode, and therefore, the light shielding regions in the light shielding layer 34 may result in the shortage of a part of view angles of the display device, and due to the arrangement of the scattering layer 38, the view angle shortage problem can be solved, and the aim of view angle uniformity can be achieved. The scattering layer 38 is generally made of a resin material in which a small-particle scattering material may be mixed to achieve a scattering effect, for example, dispersed particles may be titanium dioxide (TiO2) and the like, and there are no limits herein.

In the above-mentioned display panel provided by some embodiments of the disclosure, the emergent light may be converged by adopting different forms of light converging elements according to different shapes of color films in the sub-pixel units.

During specific implementation, in order to realize the color display of the display panel, the above-mentioned light shielding layer may include color filter films located in the light transmitting regions. For example, the color filter films may be red filter films, green filter films or blue filter films.

In addition, the color filter films in the display panel may also be made of a quantum dot material to improve the scattering effects and widen the view angles, when quantum dot color films are adopted, the light source may adopt a blue light source, the sub-pixel units may be divided into red sub-pixel units, green sub-pixel units and blue transmission sub-pixel units. The blue light source is capable of stimulating red quantum dot color films to emit red light and stimulating green quantum dot color films to emit green light.

In the actual application, when the display device only needs single-color display, the light transmitting regions may directly adopt a transparent material, and the production of the color filter films is no longer needed. A single-color backlight may be a single-color light source or a white light source, and there are no limits herein.

The above-mentioned display panel provided by some embodiments of the disclosure may also be used for transparent display, the absorption layer in the display panel needs to be removed when the display panel is used for transparent display, so that a background ray can be incident to the side of a watcher through the display panel. When being a transparent display panel, the above-mentioned display panel may be divided into a plurality of display units, as shown in FIG. 20 which is a structure, viewed from the top, of a display unit for single-color display in the transparent display panel and FIG. 21 which is a structure, viewed from the top, of a display unit for full-color display in the transparent display panel.

Figure 20:
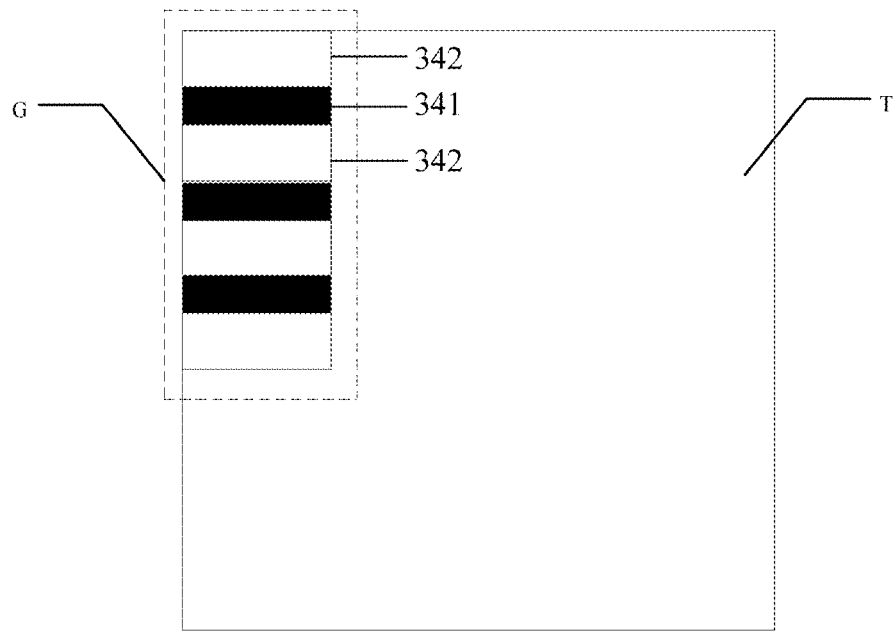
FIG. 20 is a first schematic diagram of a structure, viewed from the top, of a display unit provided by some embodiments of the disclosure.
Figure 21:
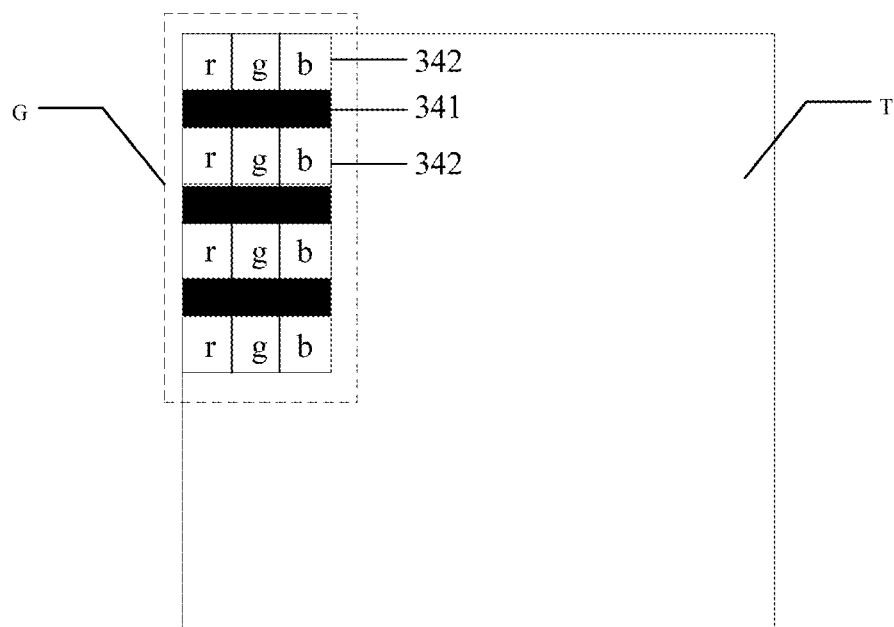
FIG. 21 is a second schematic diagram of the structure, viewed from the top, of the display unit provided by some embodiments of the disclosure.

As shown in FIG. 20 and FIG. 21, the display units include at least one sub-pixel unit (for example, all the sub-pixel units are located in a gray-scale display region G) and a transmission region T;

the sub-pixel units include the light shielding regions 341 and the light transmitting regions 342;

and the transmission regions T are the light transmitting regions except the light transmitting regions in all the sub-pixel units in the display units.

The gray-scale display region G includes one or more sub-pixel units, the plurality of sub-pixel units are arranged in both FIG. 20 and FIG. 21, for the single-color display, as shown in FIG. 20, each of the sub-pixel units includes the light shielding regions 341 and the light transmitting regions 342; for the full-color display, as shown in FIG. 21, the light transmitting regions 342 in each of the sub-pixel units may be internally provided with the color filter films. In some embodiments of the disclosure, the plurality of sub-pixel units are arranged in an array in the gray-scale display region and when the light transmitting regions 342 are symmetrically located at two sides of the light shielding regions 341, the light shielding regions in two adjacent sub-pixel units may be arranged to be overlapped, so that the occupied space in the display units is reduced. While the lighting effect can be further improved by arranging the plurality of sub-pixel units in one display unit, namely repeatedly arranging the sub-pixel units in the same display unit for many times. In the actual application, the transparency and display emergent light brightness of the transparent display device need to be comprehensively considered, the larger the number of the sub-pixel units arranged in the same display unit is, the lower the transparency of the display device is, and therefore, the sub-pixel units need to be reasonably arranged according to an actual condition, and the number of the sub-pixel units arranged in each display unit are not limited in some embodiments of the disclosure.

Based on the same inventive concept, some embodiments of the disclosure further provide a display device including any one of the above-mentioned display panels. The display device may be a liquid crystal panel, a liquid crystal display, a liquid crystal television, a mobile phone, a tablet personal computer, an electronic photo album or other display devices.

During specific implementation, as shown in FIG. 2, when the electric signals are not applied to the liquid crystal layer 33, the emergent light of the grating light extraction openings 211 are converged by the light converging elements 23, so that the emergent light of the grating light extraction openings 211 are all incident to the positions where the light shielding regions 341 of the sub-pixel units 311 corresponding to the grating light extraction openings 211 are located, and at the moment, the display of the display device is in the dark state; after the electric signals are applied to the first transparent electrode 35 and the second transparent electrode 36, the electric field is generated between the first transparent electrode 35 and the second transparent electrode 36, the liquid crystal layer 33 is equivalent to the diffraction grating structure under the action of the electric field, at the moment, the light originally incident to the light shielding regions 341 are incident to the light transmitting regions 342 under the diffraction action of the liquid crystal grating, and at the moment, the display of the display device is in the bright state; and due to the application of different electric signals to the first transparent electrode 35 and the second transparent electrode 36, different gray-scale display can be realized.

The light emergent surface of the light guide plate 21 is provided with the light converging elements 23 playing a role in converging the emergent light of the grating light extraction openings, and therefore, the size of each of the grating light extraction openings in the light guide plate can be increased, so that the arrangement sizes of the grating light extraction openings are not limited by the sizes of the light shielding regions any more, the sizes of the grating light extraction openings may be larger than the sizes of the corresponding light shielding regions, furthermore, more light are emitted from the light guide plate and are converged to the light shielding regions, and thus, the display brightness can be improved during gray-scale display, and the utilization rate of the light energy can be effectively increased.

The above-mentioned display device provided by some embodiments of the disclosure can realize gray-scale display without arranging a polarizer, so that the display brightness can be greatly improved, and meanwhile, the grating light extraction openings in the light emergent surface of the light guide plate of the backlight module are internally provided with the light converging elements capable of effectively converging the emergent light of the grating light extraction openings, so that the size of each of the grating light extraction openings in the light guide plate can be increased, the arrangement sizes of the grating light extraction openings are not limited by the sizes of the light shielding regions any more, furthermore, more light are emitted from the light guide plate and are converged to the light shielding regions, and thus, the display brightness can be improved during gray-scale display, and the utilization rate of the light energy can be effectively increased.

Although preferred embodiments of the disclosure have been described, the skilled in the art can made additional alterations and modifications on some embodiments once they know the basic creative concept. Therefore, the annexed claims are intended to be interpreted to include the preferred embodiments and all the alterations and modifications falling within the scope of the disclosure.

Obviously, the skilled in the art can make various alterations and variations on the disclosure without departing from the spirit and scope of the disclosure. In this way, if the alterations and variations of the disclosure fall within the claims of the disclosure and the scope of the equivalent technologies, the disclosure is also intended to include the alterations and variations.

The invention claimed is:
1. A display panel, comprising:
a light guide plate, the light guide plate comprising a light incident surface and a light emergent surface; the light incident surface is one end surface of the light guide plate;
an opposite substrate, arranged opposite to the light guide plate;
a liquid crystal layer, located between the light guide plate and the opposite substrate;
a light source, located on the light incident surface of the light guide plate;
a light shielding layer, located at a side, facing the liquid crystal layer, of the opposite substrate; the light shielding layer comprising a plurality of light shielding regions and light transmitting regions;
a plurality of grating light extraction openings, the grating light extraction openings being located on the light emergent surface of the light guide plate, and the grating light extraction openings correspond to the light shielding regions in one-to-one manner,
and the grating light extraction openings are internally provided with light converging elements, and the light converging elements are configured to converge light emitted from the light guide plate, and to make the light emitted from the light guide plate be emitted towards the corresponding light shielding regions when electric signals are not applied to the liquid crystal layer;
wherein areas of orthographic projections of the light shielding regions on the light guide plate are smaller than areas of corresponding grating light extraction openings.

2. The display panel according to claim 1, wherein geometrical centers of the orthographic projections of the light shielding regions on the light guide plate are superposed with geometrical centers of the corresponding light converging elements.

3. The display panel according to claim 1, wherein the light source is located on one end surface of the light guide plate; the light converging elements comprise first gratings; and grating periods of the first gratings are decreased with the increase of distances from the first gratings to the light source.

4. The display panel according to claim 1, wherein the light source is located on one end surface of the light guide plate; the light converging elements comprise at least two second gratings;
each of grating periods of the at least two second gratings is fixed, and the grating periods of any two of the at least two second gratings are different;
and a grating period of one second gratings is shorter than a grating period of another second grating, and a distance from the one second grating to the light source is longer than a distance from the another second grating to the light source.

5. The display panel according to claim 4, wherein the light converging elements comprise a plurality of second gratings, the plurality of second gratings are arranged along the same straight line, and the extension directions of slits of all the second gratings are consistent.

6. The display panel according to claim 5, comprising a plurality of sub-pixel units;
the sub-pixel units comprise the light shielding regions and the light transmitting regions located at two sides of the light shielding regions; and arrangement directions of the light shielding regions and the light transmitting regions in the sub-pixel units are consistent to a direction from the light source to sub-pixels.

7. The display panel according to claim 4, wherein in the light converging elements, one of the second gratings is used as a center, and other second gratings are uniformly arranged around the second grating located in the center.

8. The display panel according to claim 7, wherein the light converging elements comprise nine second gratings, the nine second gratings are arranged in three rows and three columns; and extension directions of slits of every two second gratings symmetric relative to the second grating located in the center are consistent.

9. The display panel according to claim 7, wherein the display panel comprises a plurality of sub-pixel units;
and the sub-pixel units comprise the light shielding regions and the light transmitting regions around the light shielding regions.

10. The display panel according to claim 1, wherein the light converging elements comprise Fresnel lenses.

11. The display panel according to claim 1, wherein the light shielding layer comprises color filter films located in the light transmitting regions.

12. The display panel according to claim 1, wherein the display panel is divided into a plurality of display units; the display units comprise at least one sub-pixel unit and transmission regions;
the sub-pixel units comprise the light shielding regions and the light transmitting regions;
and the transmission regions are the light transmitting regions except the light transmitting regions in all the sub-pixel units in the display units.

13. The display panel according to claim 1, further comprising a coupling element located between a light emergent side of the light source and the light incident surface of the light guide plate;
and the coupling element is configured to couple the emergent light of the light source into the light guide plate at an incident angle meeting a total reflection condition of the light guide plate.

14. The display panel according to claim 13, wherein the coupling element is a reflection grating or a freeform reflecting mirror.

15. The display panel according to claim 1, further comprising a transparent conductive structure;
and the transparent conductive structure is configured to make the liquid crystal layer be equivalent to a diffraction grating structure under the control of the electric signals so that the light emitted from the light converging elements are emitted towards the corresponding light transmitting regions through the diffraction grating structure.

16. The display panel according to claim 15, wherein the transparent conductive structure comprises a first transparent electrode and a second transparent electrode;
and the first transparent electrode and the second transparent electrode are located between the opposite substrate and the liquid crystal layer.

17. The display panel according to claim 15, wherein the transparent conductive structure comprises a first transparent electrode and a second transparent electrode;
and the first transparent electrode and the second transparent electrode are located between the liquid crystal layer and the light guide plate.

18. The display panel according to claim 15, wherein the transparent conductive structure comprises a first transparent electrode and a second transparent electrode;

and the first transparent electrode and the second transparent electrode are respectively located at two sides of the liquid crystal layer.

19. A display device, comprising the display panel according to claim 1.

* * * * *